Dec. 12, 1961  C. E. CALLENDER  3,012,488
PORTABLE CAMERA-HOUSING
Filed March 10, 1959  2 Sheets-Sheet 1
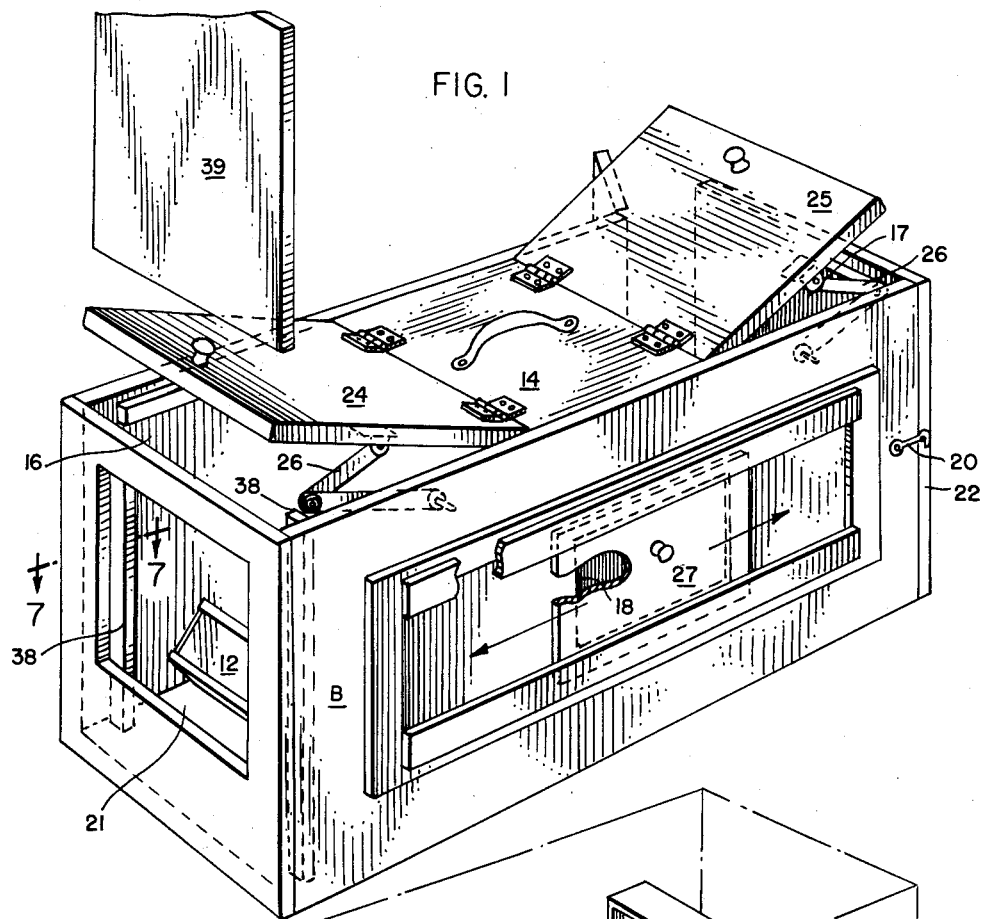
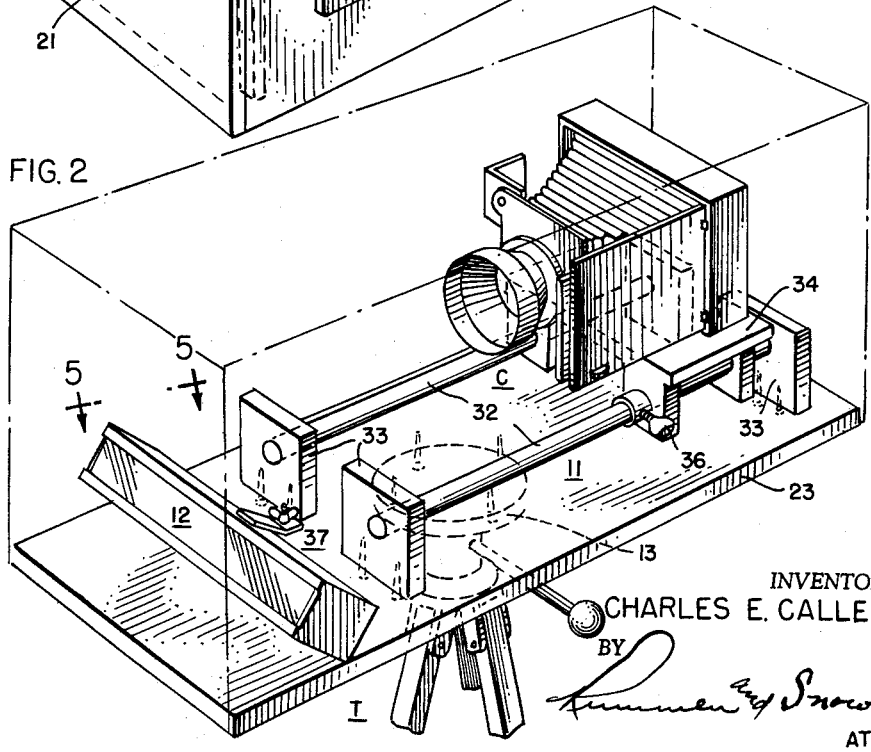
INVENTOR:
CHARLES E. CALLENDER
BY
ATT'YS Dec. 12, 1961   C. E. CALLENDER   3,012,488
PORTABLE CAMERA-HOUSING
Filed March 10, 1959   2 Sheets-Sheet 2
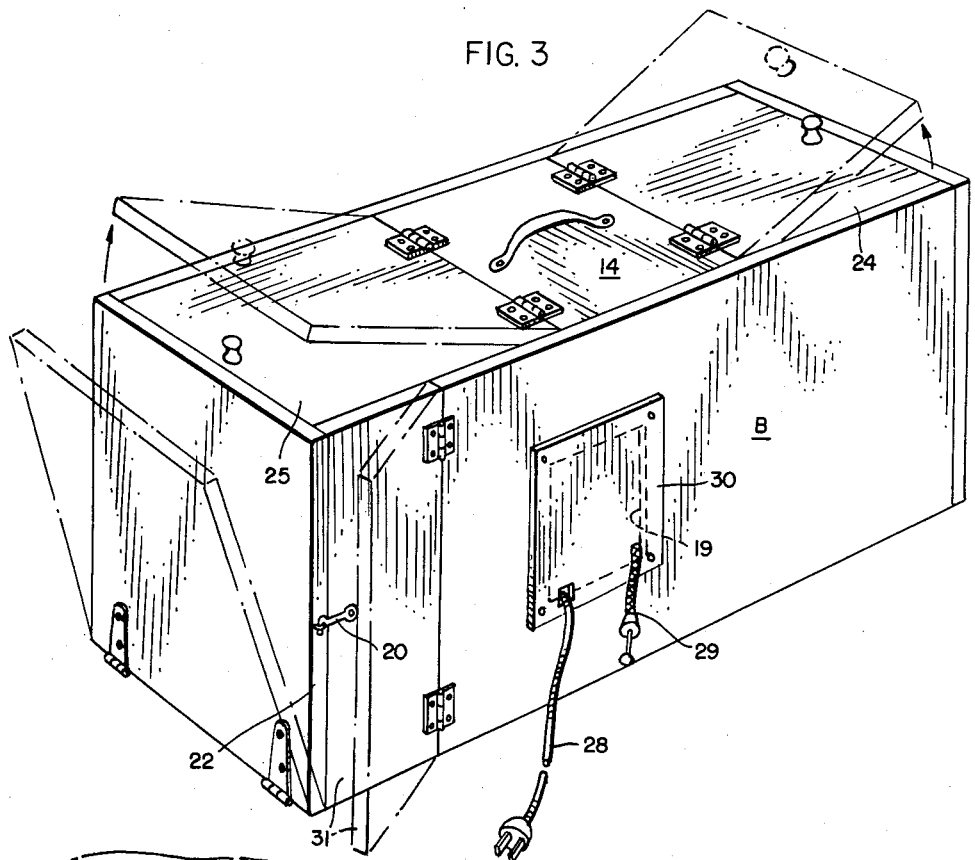
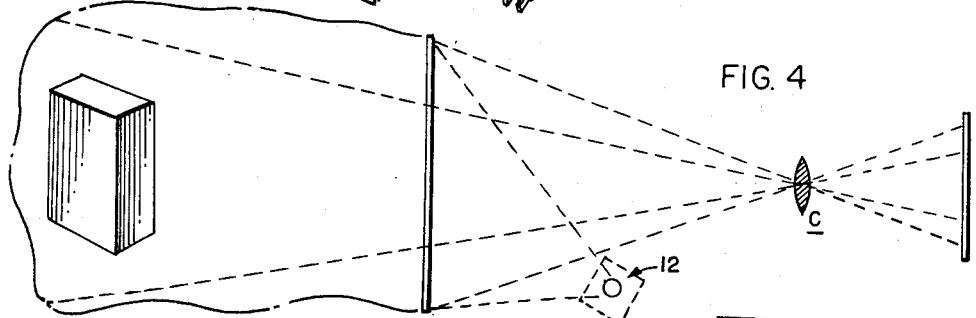
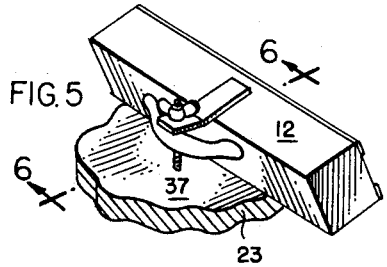
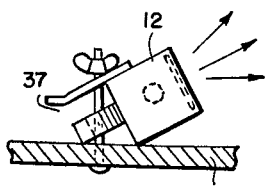
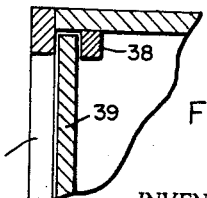
INVENTOR:
CHARLES E. CALLENDER
BY
ATT'YS

United States Patent Office 3,012,488
Patented Dec. 12, 1961

3,012,488
PORTABLE CAMERA-HOUSING
Charles E. Callender, 7843 S. Marshfield Ave.,
Chicago 20, Ill.
Filed Mar. 10, 1959, Ser. No. 798,523
1 Claim. (Cl. 95—11)

This invention relates to a portable camera-housing for photographing objects in lighted areas to record conditions visible only in the presence of an illumination producing reflective light.

Generally, the photographing of objects, animate or inanimate, to determine a surface condition detectable only by reflective lighting has had to be done in a darkened room with special illumination. For example, certain types of documents altered by erasures or ink eradicators currently can be determined only when photographing of such objects is done in a specially-illuminated dark room. Another example is crime detection when, in order to verify the planned passing of money or goods, treated with light-reflective substance, the objects and persons involved in the observed transaction have had to be transported to a distant darkroom to permit the taking of photographs to record the reflective light from special illumination.

A specific example of the problem in crime detection is the presentation of unassailable evidence which will convict those engaged in the peddling of narcotics. Offenders have to be discovered by the use of decoys or informers. Such decoy contacts a suspect and arranges for a purchase of narcotics. The money to be exchanged is treated with an invisible chemical, usually powder, capable of reflecting light only in a darkened room with the use of an ultra-violet "black light."

The officials are apprised of the deal and are concealed nearby where the transaction is to occur for a quick appearance upon a prearranged signal. The exchange of money having occurred the recipient's hands and clothing—and possibly his face, due to a passing of his hands across it—will have contacted this light-reflecting but invisible substance. Properly-taken photographs of the money, the victim's hands and clothing—and possibly other involved objects—will show incriminating evidence. However, such photographs cannot be taken in open daylight or in lighted streets or enclosures. Accordingly, the officials have had to transport the victim and other objects to some distant point where a darkened room with ultra-violet light is available for taking the desired photographs.

All too often, however, defense counsel is able to have such photographs excluded on the grounds that they were not taken at the time and scene of the exchange of money and/or other objects. It was to overcome this problem that the present invention was conceived.

The main objects of this invention, therefore, are to provide an improved portable housed-camera which makes possible the taking of photographs in lightened areas of objects treated with an invisible, light-reflecting substance; to provide an improved form of housed camera of this kind having a source of illumination juxtaposed to an open-end of the housing through which treated objects are exposable for photographing; to provide an improved camera-housing assembly permitting facile access to the camera for adjusting its position and focusing, inserting photographic plates or film, and positioning documents for photographing; and to provide an improved portable housing camera of this kind so simple in construction as to be economical to manufacture and convenient to mount and use on a conventional tripod.

One specific embodiment of this invention is shown in the accompanying drawings, in which:

FIGURE 1 is a front-end, perspective view of the box-like camera housing constructed in accordance with this invention;

FIG. 2 is a partial phantom perspective view of the box showing in full outline the box base and the camera and light as mounted thereon;

FIG. 3 is a rear-end perspective of FIG. 1 showing in full outline the hinged doors in their closed positions and in dotted outline in their partially-open positions;

FIG. 4 is a schematic view showing how a photograph is made of an object some distance in front of the housing;

FIG. 5 is an enlarged, fragmentary, perspective of the light mounting, the view being taken on the plane of the line 5—5 of FIG. 2;

FIG. 6 is a side elevation of what is shown in FIG. 5, as viewed from the line 6—6 of FIG. 5; and FIG. 7 is an enlarged, fragmentary detail of the housing construction taken on the plane of the line 7—7 of FIG. 1.

The essential concept of this invention involves an elongated, rectangular-shaped housing mounting an internal fixture for adjustably supporting a camera carriage and an extrenal fixture for attachment to a conventional tripod, the housing being equipped with an internal ultra-violet light, positioned to direct rays through an open end of the housing alined with the camera lens, and having shiftable wall sections affording access to the camera for adjustment and for the insertion and removal of plates and/or films and for locating documents in position for photographing.

A camera-enclosing housing embodying the foregoing concept comprises a box-like structure B on the base of which is secured an internal fixture 11, for support of a camera C, and a light fixture 12, for illuminating objects to be photographed, and an external fixture 13, for mounting the assembly on a conventional tripod P.

This box B is open at both ends and has a short top section 14, about one-third the length of the structure, fixed intermediate the open ends to provide top openings 16 and 17, respectively adjacent the end openings and to coact therewith in affording access to the interior of the housing from each end. The opposite sides also have openings 18 and 19 formed therein, the one being somewhat larger than the other, and both affording access to the interior of the housing intermediate its ends.

The open end 21 affords exposure to external objects to be photographed when illumined by the light fixture 12. The opposite or rear end is open and affords access for placing a camera C on the fixture 11 or removing it therefrom. A door 22, hinged to the bottom edge of the housing base 23, provides a light-tight closure for the rear open end when the camera C is in use. The door 22 is held in closed position by hooks 20. Other doors 24 and 25 are hinged to the opposite edges of the short top section 14 for swinging into and out of coplanar disposition with the top section 14 to provide light-tight closing of the openings 16 and 17 when the camera C is in use. The doors 24 and 25 are equipped with conventional toggle brackets 26 which hold the doors in their full open positions when access is to be had to the interior of the box B.

The side opening 18 affords access to the interior of the housing to permit the shifting of the camera C longitudinally on the fiixture 11 or for focusing the camera C. A door 27 is slidably mounted on the respective side for shifting into and out of position to form a light-tight closure of the opening 18 when the camera C is in use. The other side opening 19 is provided to permit the leadin of a conductor 28 for attachment to the light fixture 12 and a lead-out of the camera trip 29. This opening is closed by a fixed plate 30, which is suitably apertured for lead in and lead out of the conductor 28 and trip 29, respectively. The latter side has a short section at the rear end in the form of a narrow door 31 (FIG. 3) swingable outwardly to afford access to the camera C for the sidewise insertion and removal of photographic plate-holders.

All walls forming the interior of the box B as well as the inner faces of all doors are coated with a dull black paint, and all joints are made light-proof.

The fixture 11, for supporting the camera C, as here shown, comprises a pair of parallel rods 32 supported on blocks 33 secured to the base 23 of the box-like housing B. The forward blocks 33 are spaced inwardly from the exposure opening 21, whereas the rearward blocks 33 are located closely adjacent the rear end. A camera carriage 34 is slidably supported on the rods and provided with a thumb set-screw 36 for fixing the position of the carriage 34 axially along the rods 32.

The light fixture 12 is a conventional 110 volt, 60 cycle, 3680 Angstrom Unit Long U.V. fixture, of the type manufactured by the Black Light Products, Inc. of Chicago, Ill. In length it is but slightly less than the inside width of the box B. It is secured to the box base 23 by an adjustable bracket 37 for positioning on one of its longitudinal edges and disposing the plate-covered light opening at approximately 45 degrees to the plane of the exposure opening 21.

The tripod fixture 13 here is shown only in the form of a disk-shaped plate attached to the under side of the box base 23 nearly centrally thereof. An axial hub (not shown) seats in a socket of the tripod turret.

The exposure opening 21, at the front end of the box, here is shown dimensioned slightly less than the width and height of the box B. Spaced inwardly parallel to this end are secured guide rails 38 along the lateral sides, which permit the insertion of a panel 39 (FIGS. 1 and 7) to close the exposure opening 21 and mount documents on the inner face thereof for photographing inside the box B.

The camera C, for use in such a housing B, obviously, may be any one of the many styles, sizes and makes available on the open market, and generally used for this type of work. Such a camera would be set on and suitably attached (temporarily) to the carriage 34.

A housing-mounted camera of this kind makes possible the taking of photographs of "marked" objects and/or persons at the time and scene where there has been an apparent criminal action. Obviously, the suspect would be put under arrest by the detectives, hence subject to search and photographing.

Any such operation would be effected substantially as follows:

Money, documents, and/or small objects could be temporarily attached to the inside face of the panel 39, set in the guideways 38. With the camera loaded and appropriately adjusted and focused, all the doors closed, and the current turned on to the light fixture 12, a depression of the camera trip 29 would secure a photograph of these objects showing areas of reflected light caused by spots of the otherwise invisible chemical.

With the panel 39 removed and the opening 21 placed against a victim's clothing, a photograph would reveal spots of reflected light caused by the rubbing off of the chemical when the money or other objects were put in the victim's pockets. Photographs of objects, such as a package of cigarettes, a wallet, can be taken positioned some distance from the opening 21 by simply placing a light-proof cloth around the object and the forward end of the housing, as indicated in FIG. 4.

Photographs of this kind, taken at the time and place of the commission of a crime, are not likely to be subject to impeachment as too often occurs with similar photographs taken at a time and place remote from the actual crime commission.

It will be understood that the use of this improved camera-housing assembly can be used for making photographs, in lighted areas, of other kinds of situations involving objects "marked" with invisible light-reflecting chemicals.

It is also to be understood that where a source of electric current is not available this unit is also capable of being operated with conventional batteries.

Although but one specific embodiment of this invention is herein shown and described it will be understood that details of the construction shown may be altered or omitted without departing from the spirit of the invention as defined by the following claim.

I claim:

A portably-housed camera, for use in making on-the-spot photographic records in normally-lighted areas of persons and/or objects the involvement of which in detected criminal acts has resulted in contact with a fluorescent substance, comprising an elongated, rectangular-shaped housing open at one end for the exposure of the subject to be photographed, a fixture adjustably mounted in the housing, a camera positioned on the fixture for focusing exposure of a subject through the housing open end, an ultra-violet light positioned inwardly adjacent the housing open end to direct light rays outwardly through the open end onto the subject to be photographed, sections of the housing walls being hinged to swing into and out of planes of the respective walls to permit inserting a camera in and removing it from the housing, adjusting its position therein, and inserting and removing photographic plates, and a panel insertable vertically inward of the open end wall of the housing for mounting objects thereon for exposure to the rays from the light.

References Cited in the file of this patent

UNITED STATES PATENTS

| | | |
|---|---|---|
| 349,133 | Anthony | Sept. 14, 1886 |
| 435,342 | Blackmore | Aug. 26, 1890 |
| 906,071 | Shaffner | Dec. 8, 1908 |
| 1,270,280 | Folmer | June 25, 1918 |
| 1,470,708 | Blum | Oct. 16, 1923 |
| 1,507,915 | Goldsmith | Sept. 9, 1924 |
| 2,652,754 | Dedek | Sept. 22, 1953 |
| 2,909,107 | Simjian | Oct. 20, 1959 |